United States Patent [19]
Anderson et al.

[11] Patent Number: 6,070,178
[45] Date of Patent: May 30, 2000

[54] GENERATING RANDOM NUMBERS FROM RANDOM SIGNALS WITHOUT BEING AFFECTED BY ANY INTERFERING SIGNALS

[75] Inventors: Thomas Harris Anderson, Rohnert Park; Eric Arden Blossom, Monterey, both of Calif.

[73] Assignee: Starium LTD, Monterey, Calif.

[21] Appl. No.: 09/252,355

[22] Filed: Feb. 17, 1999

[51] Int. Cl.[7] ............................. G06J 1/00; G06F 7/58; G06G 7/00; H04B 1/38

[52] U.S. Cl. ......................... 708/3; 708/801; 708/250; 375/222

[58] Field of Search ...................... 708/3, 250, 252, 708/801; 375/222; 380/46

[56] References Cited

U.S. PATENT DOCUMENTS

| | | | |
|---|---|---|---|
| 5,239,494 | 8/1993 | Golbeck | 708/3 |
| 5,291,555 | 3/1994 | Cuomo et al. | 708/250 |
| 5,412,587 | 5/1995 | Holt et al. | 708/250 |
| 5,627,775 | 5/1997 | Hong et al. | 708/250 |
| 5,828,752 | 10/1998 | Iwamura et al. | 708/250 |

*Primary Examiner*—Tan V. Mai
*Attorney, Agent, or Firm*—Law Firm of Naren Thappeta

[57] ABSTRACT

A random number generator for generating random numbers. The generator may include two similarly implemented random signal sources, with each source generating a random signal. A difference signal of the two random signals is generated with the result that any common interference signal components are eliminated.

17 Claims, 4 Drawing Sheets

GENERATING RANDOM NUMBERS FROM RANDOM SIGNALS WITHOUT BEING AFFECTED BY ANY INTERFERING SIGNALS

BACKGROUND OF THE INVENTION

1. Field of the Invention

The present invention relates to random number generating circuits, and more specifically to a method and apparatus for generating random numbers from random analog signals without being affected by interfering signals.

2. Related Art

Random numbers are used in many applications, ranging from simple number guessing games, lotteries, to more serious applications such as cryptography. For games, a random number generator may consist of the rolling of a dice. For lotteries, a typical random number generator consists of the use of equally weighted balls with number written on each. Balls are typically blown into the air by turbulent air flow and several balls are randomly drawn out from the air. The numbers written on the drawn balls generally represent random numbers.

In the field of cryptography, random numbers are used to derive keys. In a typical cryptography application, readily understandable plaintext is processed at a source end to disguise the information underlying the plaintext. Such processing of plaintext is referred to as encryption and the result of the processing may be referred to as ciphertext. The ciphertext may then be processed at a receiving end to recover the plaintext The recovery process is referred to as decryption. By encrypting the plaintext, the plaintext may be transmitted securely in the sense that an unknown third party may not be able to decipher the underlying information.

A key generally refers to a number which may be used for functions such as encryption, decryption, authentication (to verify the origin of the ciphertext) or the like as is well known in the relevant arts. Some encryption technologies are described in a book entitled, "Applied Cryptography", by Bruce Schneier, ISBN Number: 0-471-11709-9, which is incorporated into the present application in its entirety herewith.

Random numbers are often generated from random signals. A typical random number generator circuit starts with a random signal source for generating random signals. Examples of random signal sources are resistors and Zener diodes. The generated random signals are typically of low voltage and low current, and are commonly amplified before they can be used to generate a useful digital output. The random analog signal can be sampled at different time points to generate digital data. The digital data may itself represent a random number, or several samples or digital data may be combined to form a random number with several digits.

One problem with generating random numbers from random signal sources is that interference may introduce non-random components into the signal ("contaminated signal") used for generating the key. As a result, non-randomness may be introduced into the numbers generated as random numbers. In general, such non-randomness may simplify the decryption of ciphertext, and may vulnerable to successful decryption by third parties.

Interference may be particularly problematic in devices such as modems used in computer systems. Modems may use keys for cryptography. The modems are typically implemented on a circuit board close to an electrical power source. The power source may emit the interference signals. Other external sources such as lights may introduce interference signals as well.

There are several well-known methods to eliminate these interference signals. For instance, if the frequency of the interfering signal is known, then by setting the sampling rate to be the same as that of the interfering signal, the interfering signal is constant for all sampling points. However, the frequency of the interfering signal may not be known or change over time, and thus the solution may be unacceptable in several situation.

An alternate solution to the interference problem is to isolate the circuit from the interference. For example, random number generating circuits may be encapsulated within a metal container. However, such metal container adds significant cost to the overall random number generator, and may thus be undesirable.

Therefore, what is desired is a low cost random number generator that is capable of rejecting interference, which may introduce non-randomness.

SUMMARY OF THE INVENTION

A random number generator implemented in accordance with the present invention may use two random signal sources, with each random signal source generating a random signal. A subtractor generates a difference signal of the two random signals, with the result that any common interference signal components present in the two random signals may be eliminated.

By eliminating any non-random components present in the interference signals, the difference signal may be a truly random signal. The difference signal may be amplified, and an analog to digital converter (ADC) may generate digital numbers from the amplified difference signal. The digital numbers may represent random numbers because of the randomness of the difference signal.

The random signal source may be implemented using a resistor (commonly available in the marketplace) to generate thermal noise. This solution minimizes the overall costs. A low pass filter (e.g., a capacitor in parallel) may be implemented to eliminate high frequency fluctuations from the signals generated by resistors.

A power source driving the amplifier may introduce non-random interference signal components while amplifying the difference signal. As the random signals provided as inputs to the amplifier may be weak (e.g., have low voltage), the interference signal components may be pronounced.

To minimize the effect of any interference components which may be introduced by the amplifier amplifying the difference signal, the random analog signals generated by the thermal resistors may be first amplified by using amplifiers sharing the same power source(s). Accordingly, both the amplified random analog signals may contain similar interference components.

The amplified analog components may then be provided as inputs to a subtractor, which eliminates the similar interference components. Even though the difference signal of the amplified signals may be again amplified, any interference signals introduced with this amplification are less pronounced due to the prior amplification of the random analog signals.

Thus, the present invention provides an effective method of generating random numbers by generating a difference signal of multiple random analog signals, and generating random numbers from the difference signal.

The present invention provides a cost-effective random number generator as only low cost components such as resistors and amplifiers may be required.

The present invention eliminates the effect of external sources generating interference signals by placing the random signal sources in a similar position relative to the external source such that the random signal sources contain similar interference signal components.

The present invention is particularly suited for modems used in computer systems as random numbers can be generated without being affected by potential interference by sources such as power supply, high speed clocks and external lights.

The present invention minimizes the effect of any interference signal components which may be introduced by amplifiers by using amplifiers for first amplifying the random analog signals and then generating the difference signal.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

Figure 1A:
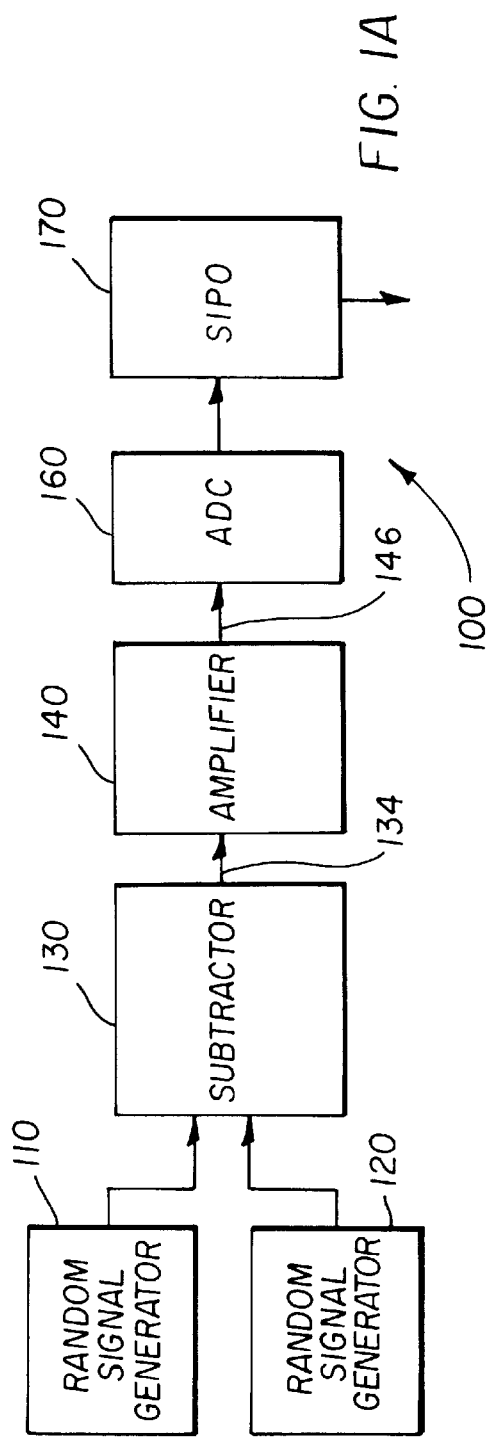
FIG. 1A is a block diagram illustrating an embodiment of random number generator in accordance with the present invention.

The present invention eliminates interference signals introduced into random signals by using multiple random signal generators, and by subtracting the outputs from these random signal generators to eliminate any interfering signals common to all the random signal generators. The present invention is generally described with reference to FIG. 1A, which depicts an embodiment of random number generator 100 in accordance with the present invention.

Random number generator 100 may include first random signal source 110, second random signal source 120, subtractor 130, amplifier 140, analog to digital circuit (ADC) 160 and serial-in parallel-out (SIPO) 170. Each of the random signal sources 110 and 120 generates a random analog signal. The outputs of the random signal sources 110 and are fed as an input to subtractor 130. Random analog signal sources 110 and 120 may be implemented in a known way.

Subtractor 130 may generate a difference signal of the two analog signals provided as inputs. The input signals may contain interference signals. The interference signals may have been introduced anywhere. For example, both random signal sources 110 and 120 may be affected by an external signals while generating random analog signals to introduce non-random components. Interference may be introduced while generating the random signal sources also.

As subtractor 130 subtracts the two input signals, any common interference signals present in the two input signals may be eliminated in accordance with the present invention. As a result, the output of subtractor 130 on line 134 may represent a random analog signal, free at least from any common interference signals.

The implementation of subtractor 130 generally depends on the nature of interference signals sought to be eliminated. In the description below, random voltage components are generally eliminated. However, other types of interference signals (e.g., non-random frequency components or phase components) can be eliminated in accordance with the present invention by employing the appropriate devices.

Amplifier 140 may be used to amplify the output of subtractor 130. The amplification is generally performed as the output of subtractor 130 is of low voltage or current. Amplifier 140 may be implemented using one of several commercially available components. The output of amplifier 140 may be provided as an input to ADC 160.

The output of ADC 160 may represent random numbers, with each number containing multiple bits. In an embodiment, ADC 160 is implemented as a comparator, which generates a one bit output depending on the comparison of input signal to ADC 160 with a reference signal (not shown).

The output of ADC 160 may be provided as an input to serial-in-parallel out (SIPO) 170. SIPO 170 may provide a random number having several bits from the serial input received from ADC 160. SIPO 170 may be implemented in a known way. The output of SIPO 170 may represent a desired random number. Thus, random number generator 100 may be used to generate random numbers without being affected at least by any common interference signals present in the two input signals generated by signal sources 110 and 120.

Figure 1B:
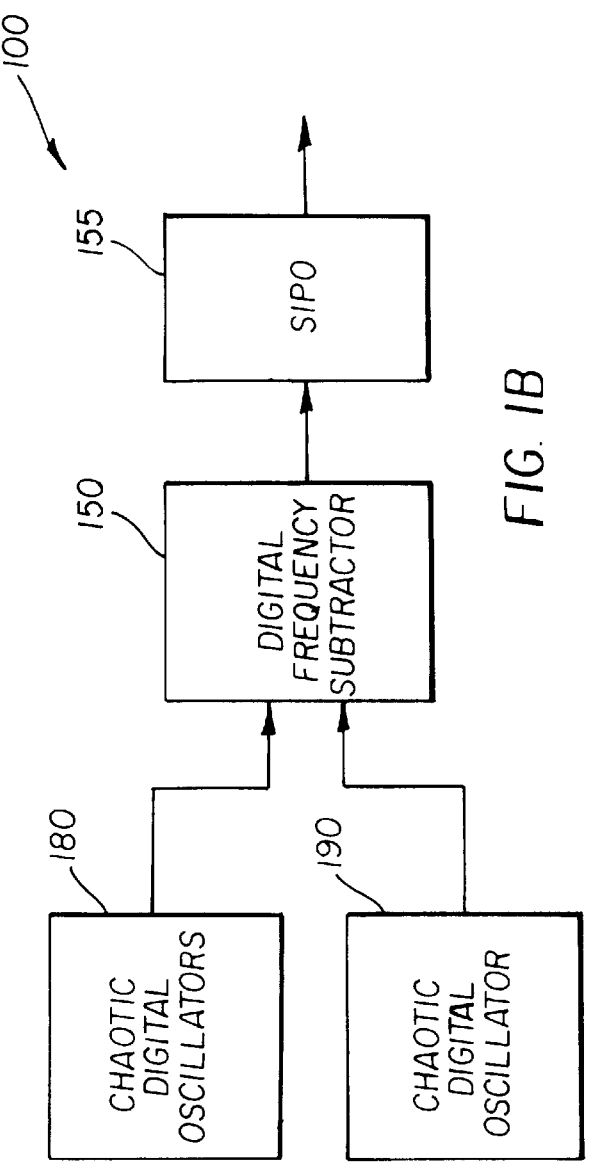
FIG. 1B is a block diagram illustrating an alternative embodiment of random number generator in accordance with the present invention.

Even though the present invention is described substantially with reference to random signal sources generating analog random signals, it should be appreciated that the present invention can be implemented in digital domain as well as illustrated with reference to FIG. 1B. Random number generator 100 of FIG. 1B contains chaotic digital oscillators 180 and 190 designed to generate random frequency signals. The output frequency of these random frequency signals may be shifted by interference signals.

Digital frequency subtractor 150 may be employed to eliminate the effects of such common interference signals. In general, components commonly known as mixers may be employed to eliminate interference signals in the form of frequency components. Mixers are available in both analog and digital form. SIPO 155 may operate similar to SIPO 170.

Thus, random numbers can be generated in several types of environments using different components in accordance with the present invention. The present invention is described below in further detail, first with reference to the flow-chart of FIG. 2.

2. Method According to the Present Invention

Figure 2:
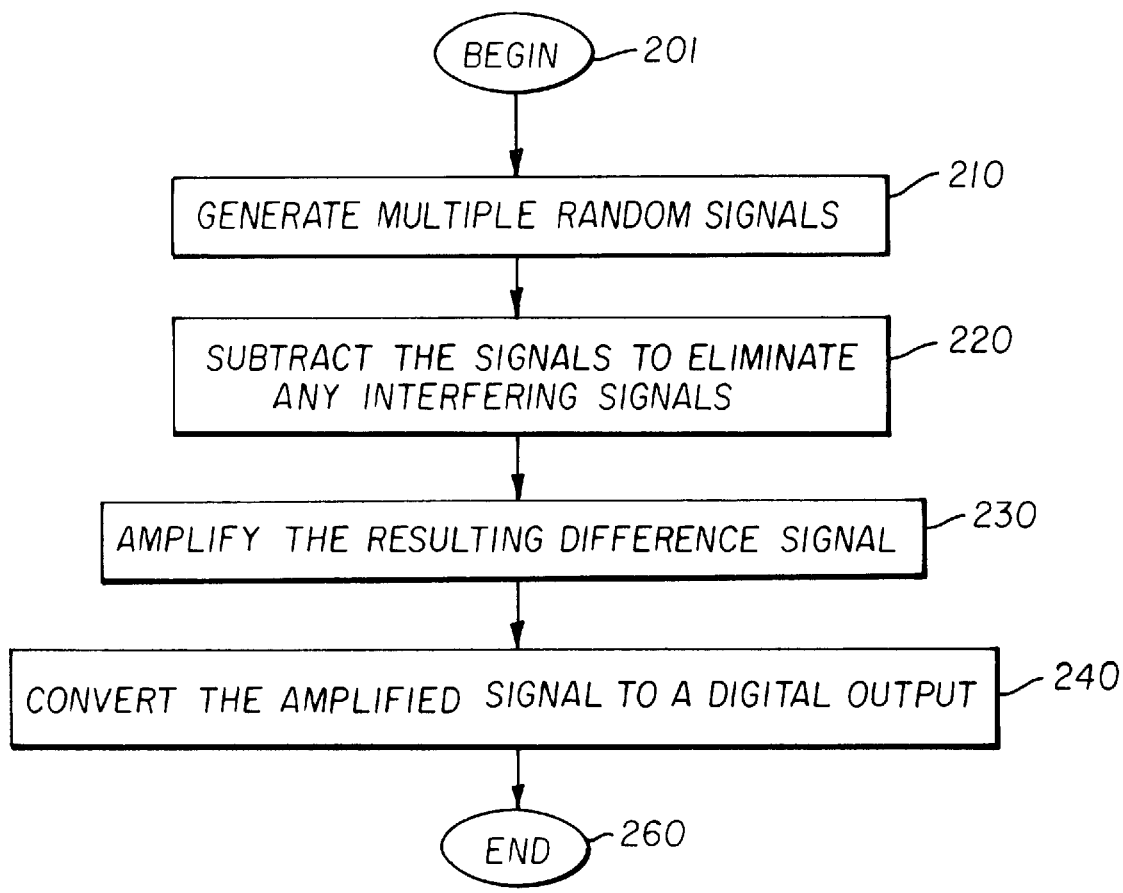
FIG. 2 is a flow chart illustrating a method in accordance with the present invention.

FIG. 2 is a flow chart illustrating a method according to the present invention. In step 210, multiple random signals may be generated. These random signals are then subtracted, typically in the form of pairs (i.e., two at a time) in step 220. The result of the subtraction may be termed as a difference signal. Any interfering sources would affect both random signal sources, and thus, in this step 220, the common interfering signal components would be canceled or eliminated.

The difference signal may then be amplified in step 230. The amplified signal is then sent to an analog to digital converter, where the analog signal may be sampled at various time points to generate random numbers in step 240. Thus, the method of FIG. 2 can be used to generate random numbers free from any common interferences present in the signals presented for subtraction in step 220. The description of the present invention is continued with reference to random signal sources 110 and 120. Some general considerations are noted first and specific embodiments are described then.

3. General Considerations in the Design of Random Signal Sources

In general, random signal sources 110 and 120 may be constructed from substantially similar components, and be located such that both would be equally impacted by any external interferences. For example, if the external interference is expected to be from an electrical power source, it is preferable that both the random signal sources 110 be equidistant from the electrical power source.

Thus, in a computer system, both random signal sources may be attached to a same substrate (e.g., logic board) such that any interference from external circuits and power sources is the same on both random signal sources 110 and 120. As a result, the signals generated by random signal sources 110 and 120 may contain at least substantially similar interfering components, and may be eliminated by subtraction.

Also, one of several commercially available products can be used as random signal sources 110 and 120. Examples of such products include resistors and Zener diodes well known in the relevant arts. In applications at microwave frequencies, Zener diodes may be used in random signal sources 110 and 120 because amplifiers in such applications are often designed to be driven from a 50 Ohm source impedance, and at this impedance level Zener diodes have more noise than a resistor.

Zener diodes can be biased near the threshold of Zener breakdown, where they generate signals of greater strength (voltage, current) than that would be generated by a resistor of the same impedance. This stronger signal is valuable because high gain amplifiers 140 for high frequency operations are expensive, and a higher signal means less amplification is needed for the application.

For lower frequency circuits, amplifiers with high input impedance are relatively inexpensive. Therefore, resistors with much larger than 50 Ohms can be used in these low frequency circuits. These large resistors generally generate higher voltage signals than Zener diodes, yet cost much less. Another advantage to using resistors is that these resistors have lower variation in the amount of signal they produce. Accordingly, embodiments of random signal source 110 are described below as being implemented using resistor 320.

If the variation in the amount of signals generated by random signal source 100 or due to external interference exceeds the dynamic range of the amplifiers in the circuit, amplifier 140 or subtractor 130 may saturate, and will not be able to process the signal. This saturation problem can be addressed several ways. An embodiment addressing this problem is described below with reference to FIG. 3. Even though the description of FIG. 3 is provided with reference to random signal source 110, the description is applicable to random signal source 120 as well.

4. Random Signal Source Using Resistors

Figure 3:
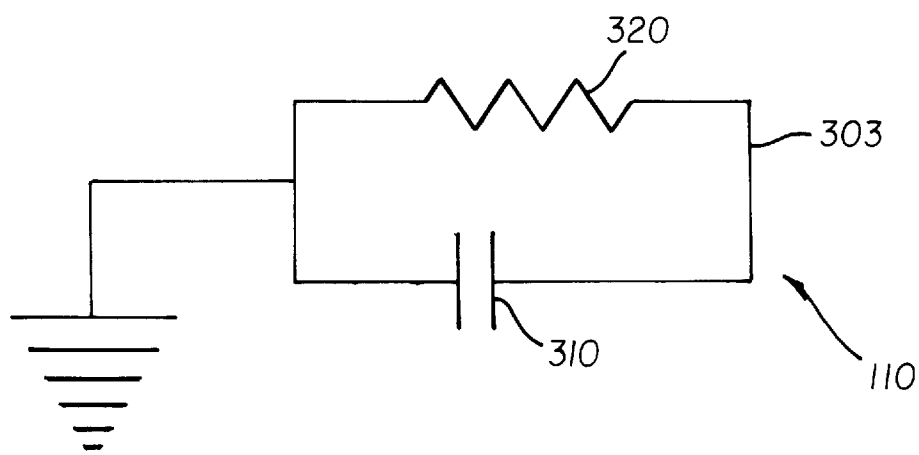
FIG. 3 is a diagram showing the details of one embodiment of a random signal source.

FIG. 3 is a block diagram illustrating an embodiment of random signal source 110, which addresses the saturation problem noted above. Random signal source 110 may include resistor 320 and capacitor 310. Capacitor 310 is positioned parallel to resistor 320, and may operate as a low pass filter to minimize sudden surges (and thus the resulting uncertainty) in the signal level generated by resister 320 and high-frequency interference signals.

To further reduce the saturation problem, amplifier 140 may also be designed to have a bandwidth that is greater than the bandwidth of the combined random signal, interference signal and capacitor 310. This reduces the uncertainty in the signal sent to the subtractor 130 and thus ensure that amplifier 140 will not be saturated.

One problem with random number generator 100 using random signal generator 110 of FIG. 3 is that amplifier 140 may itself operate from power sources (not shown) which introduce undesired interference signal into the output generated for ADC 160. As the introduced interference signal component may be relatively strong compared to the difference signal generated by subtractor 130, the interference may make the numbers generated by random number generator 100 less random. One way of minimizing the effect of interference signal component introduced during amplification is illustrated with reference to FIG. 4.

5. Alternative Embodiment of Random Number Generator

Figure 4:
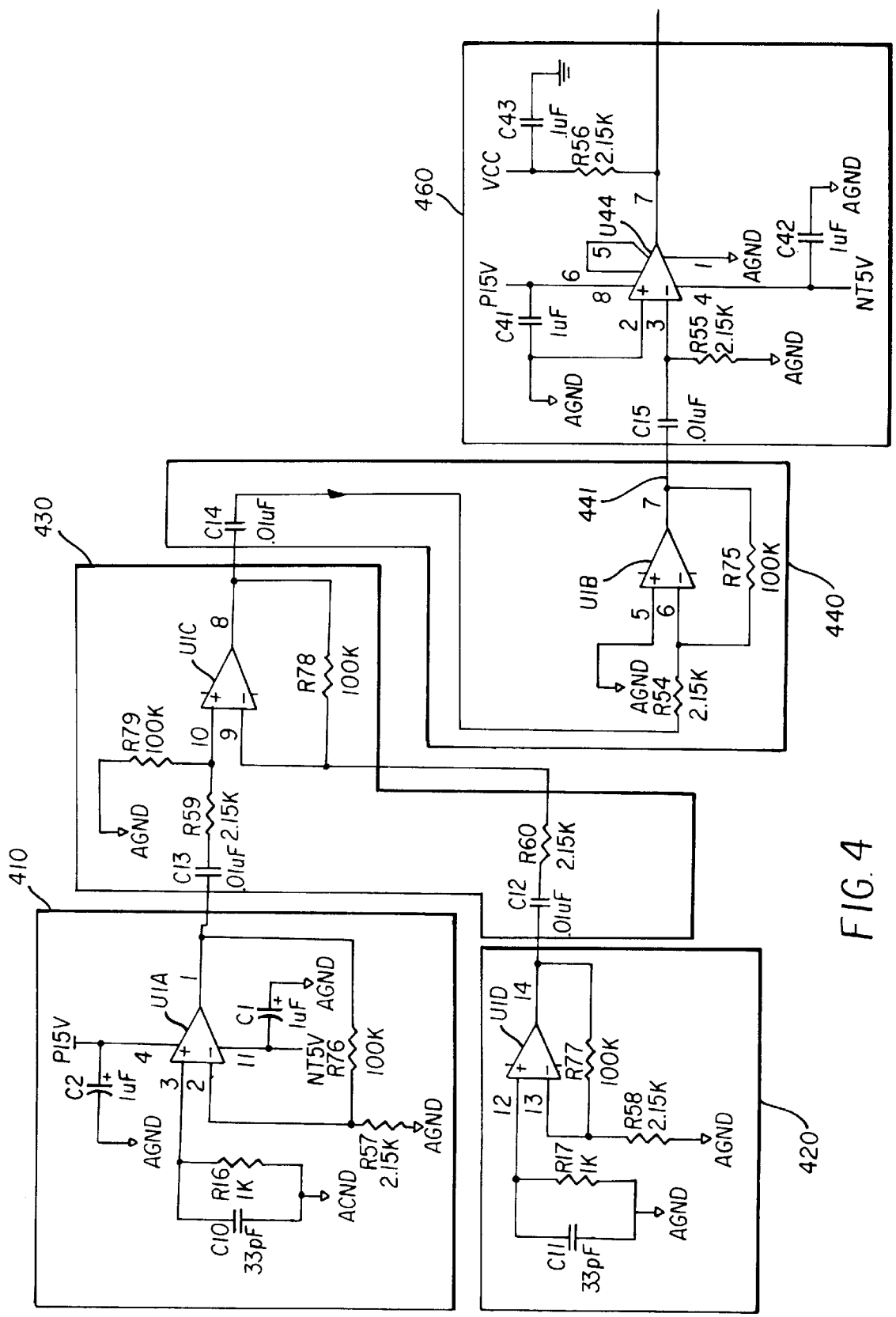
FIG. 4 is a diagram illustrating an alternative embodiment of random number generator in accordance with the present invention.

FIG. 4 is a block diagram of random number generator 400 illustrating the manner in which the effect of any interference introduced by the electrical power sources driving amplifiers can be minimized. The diagram further depicts some implementation details also. Of significance is the presence of amplifiers U1A and U1D in random signal generators 410 and 420 respectively as described below in further detail.

Random signal generator 410 is shown including resistor R16 coupled in parallel to capacitor C10, for reasons described above with reference to FIG. 3. Amplifier U1A amplifies the signal generated across resistance R16. A gain of about 50 may be expected as the resistors R76 and R57 having a resistance of 100K Ohms and 2.15K OHMS are shown being used. Amplifier U1A is driven by power sources P15V (having a voltage of 15 Volts) at the positive terminal and N15V (voltage of 15 Volts) at negative terminal. Resistor R16 may have a resistance of 1K Ohms and capacitor C10 may have a capacitance of 33 pF (PicoFarads). The capacitance and resistance of other components are also noted in FIG. 4.

Random signal generator 420 includes components (C11, R17, R77, R58) having similar characteristics to those (C10, R16, R76, R57 respectively) in random signal generator 410. Even though not shown in the diagram for clarity, amplifier U1D shares the power sources with U1 A, since U1A, U1B, U1C and U1D each comprise one-fourth of a monolithic quad op-amp. As a result, any interference signal component introduced by the power sources P15V and N15V may be introduced into the output of both random signal generators 410 and 420. The output of random signal generator 410 is provided as an input to subtractor 430 via DC blocking capacitor C13 and resistor R59. The output of random signal generator 420 is provided to subtractor 430 via DC blocking capacitor C12. DC blocking prevents offset voltages on U1A and U1D from causing saturation in U1C.

Subtractor 430 generates a difference signal of the two inputs received from random signal generators 410 and 420.

Any interference signal component introduced by power sources into the output of amplifiers U1A and U1D (along with interference signal components introduced by external sources) may be eliminated as both amplifiers operate from the same power sources P15V and N15V.

The output of random signal generator 420 is connected to one input of differential amplifier U1C by capacitor C12. The output of random signal generator 410 is connected to the other input of differential amplifier U1C by capacitor C13. The combination of resistor R59, R60, R78, R79 and U1C form a differential amplifier. U1C may correspond to an operational amplifier.

Amplifier 440 provides any necessary amplification of the difference signal generated by subtractor 430. The combination of R54, R75, and U1B form an inverting amplifier. U1B may correspond to an operational amplifier. It may be noted that any interference signal component introduced by amplifier 440 will generally be smaller proportion of the total output signal generated on line 441 compared to any interference signal component introduced by amplifier 140 in relation to the total output signal generated on line 146 of FIG. 1. This is due to the pre-amplification performed by amplifiers U1A, U1C and U1D.

The output of amplifier 440 is provided as an input to ADC 460, which is implemented using comparator U44. The reference input of comparator U44 is grounded. The other input of differential amplifier U44 is driven by the output of amplifier 440 via a capacitor C15. Capacitor C15 blocks DC voltages due to offsets in U1B. C41, C42 and C43 filter power supply voltages P15V, N15V, and Vcc respectively. R55 provides DC bias current to the input of U44. R56 is a pull-up transistor for the output of U44. The output of differential amplifier U44 is a value of 1 or 0 depending on the comparison of the two inputs.

The output of amplifier 440 may be sent to a component such as SIPO 170 shown in FIG. 1 to generate a multi-bit random number. It should be further understood the blocks 410, 420, 430, 440 and 460 of FIG. 4 may respectively replace blocks 110, 120, 130, 140, and 160 of FIG. 1.

Thus, either of random number generators 100 and 400 can be used to generate random numbers in accordance with the present invention. Some example environments which can the random number generators are described below.

6. Example Environment

Figure 5:
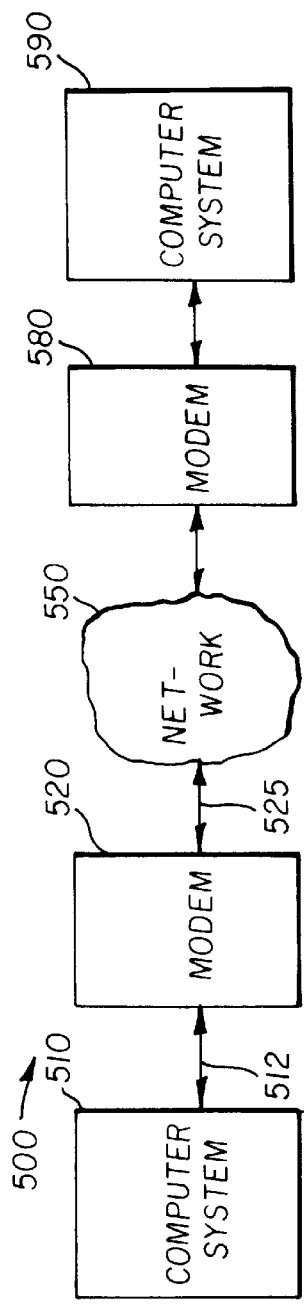
FIG. 5 block diagram illustrating an example environment in which the present invention can be implemented.

FIG. 5 is a block diagram of telecommunication system 500 illustrating an example environment in which the present invention can be implemented. Telecommunication system 500 includes computer systems 510 and 590, network 550, and modems 520 and 580. Modems 520 and 580, and network 550 enable the transfer of digital data between computer systems 510 and 590. Network 550 is generally designed to transfer voice received in the form of analog signals, and may correspond to a general switched telephone network well known in the relevant arts. Network 550 can be implemented using analog or digital transmission technologies.

Computer systems 510 and 590 may be implemented in a known way. Computer system 590 may be implemented similar to computer system 510, and modem 580 may be implemented similar to modem 520. Accordingly, the description of the present invention is continued with reference to only computer system 510 and modem 520 for conciseness. However, it should be understood that the description may be applicable to computer system 590 and modem 580 as well respectively.

Computer system 510 uses modem 520 to communicate with external systems such as computer system 590. The interface between computer system 510 and modem 520 is generally according to pre-defined interfaces and protocols. For example, Hayes Modem Standards described in the document entitled, "Hayes Technical Reference Manual", available on the world-wide-web at URL, "http://www.hayes.com/support/techref/index.htm", and from Hayes Microcomputer Products, Inc., P.O. Box 105203, Atlanta, Ga. 30348, can be used to implement the interface. The document is incorporated into the present application in its entirety.

Even though modems 520 and 580 are shown external to the respective computer systems 510 and 590, modems 520 and 580 can be integrated into computer systems 510 and 590 respectively in ways well known in the relevant arts. In such situations, the modems may be provided as hardware cards which can be plugged into slots provided on computer motherboards (logic boards)

Modems 520 and 580 may be designed to provide secure communication between computer systems 510 and 590 using one of several cryptography technologies. Encryption technologies often require random numbers as keys, and each of the modems 520 and 580 may use random number generators 100 and/or 400 in accordance with the present invention as described below in further detail. The description is provided with reference to modem 520 for conciseness. However, the description may be applicable to modem 590 also.

7. Modem

Figure 6:
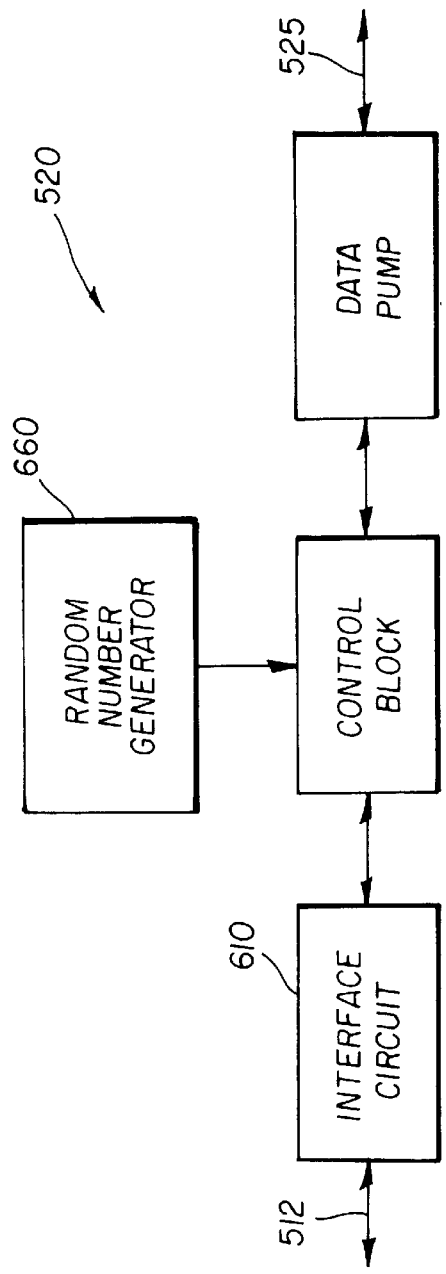
FIG. 6 is a block diagram illustrating an embodiment of modem using an random number generator in accordance with the present invention.

FIG. 6 is a block diagram illustrating an example implementation of modem 520 in accordance with the present invention. Modem 520 includes interface circuit 610, control block 650, random number generator 660, and data pump 690. Random number generator 660 may correspond to the circuits to described in either FIG. 1 or FIG. 4. Each block is described in further detail below.

Interface circuit 610 receives data from and sends data to computer system 510 on line 512. Interface circuit 610 may be implemented using ITU-T V.25 or V.25bis standards in a known way. Data pump 690 receives data from and sends data to network 550 on line 525. Data pump 690 generally converts digital data received from computer system 510 into signals suitable for transmission on line 525. Similarly, data pump 690 converts signals received on line 525 into digital data for eventual transmission to computer system 510. Data pump 690 may be implemented to conform to ITU-T V.32bis standard in a known way.

Control block 650 may provide the timing and the control signals to coordinate and control the operation of all blocks in modem 520. Control block 650 may perform other functions such as error correction and compression in cooperation with modem 580. These functions may be performed in a known way.

Control block 650 may use cryptography technology while communicating with modem 580. That is, control block 650 may receive plaintext from computer system 510 on interface circuit 610, and encrypt the plaintext to generate ciphertext. The ciphertext may be transmitted to computer system 590 using data pump 690. Similarly, control block 650 may receive ciphertext from computer system 590 using data pump 690, and decrypt the ciphertext to generate the plaintext encoded in the received ciphertext.

Control block 650 may use one of several cryptography technologies for such encryption and decryption. Some example cryptography technologies and algorithms are described in a book entitled, "Applied Cryptography", by Bruce Schneier, ISBN Number: 0-471-11709-9, which is incorporated into the present application in its entirety herewith.

In many such cryptography technologies, control block 650 may need a key, for example, as an encryption key. Random number generator 660 generates the required keys. Due to the truly randomness of the number generated in accordance with the present invention, it may be hard for an intruder (unknown party between the two computer systems 510 and 590) to decode the ciphertext. As a result, the communication between computer systems 510 and 590 may be secure.

8. Conclusion

While various embodiments of the present invention have been described above, it should be understood that they have been presented by way of example only, and not limitation. Thus, the breadth and scope of the present invention should not be limited by any of the abovedescribed embodiments, but should be defined only in accordance with the following claims and their equivalents.

What is claimed is:

1. A random number generator for generating random numbers, said random number generator comprising:

a first signal source for generating a first random signal;

a second signal source for generating a second random signal; and a subtractor for generating a difference signal of said first random signal and said second random signal, wherein generating said difference causes any interference signal components common to both said first random signal and said second random signal to be eliminated and wherein said difference signal can be used to generate said random numbers.

2. The random number generator of claim 1, wherein said interference components are introduced by a source external to said random number generator.

3. The random number generator of claim 2, wherein said first signal source and said second signal source are designed to be located in a similar positions relative to said external source such that both of the signal sources are similarly susceptible to said external source.

4. The random number generator of claim 1, wherein each of said first signal source and said second signal source comprises a resistor.

5. The random number generator of claim 4, wherein each of said two signal sources further comprise a low pass filter to filter high frequency components generated by said resistor.

6. The random number generator of claim 1, wherein each of said two signal sources further comprise an amplifier for generating an amplified signal as said random signal, wherein both of said amplifiers are driven by a common power source such that any interference signal introduced by said common power source is eliminated in said subtractor.

7. The random number generator of claim 1, wherein said random signal comprises an analog random signal.

8. The random number generator of claim 1, wherein said random signal comprises a digital random signal.

9. The random number generator of claim 1, wherein said random signal comprises a signal with relatively constant amplitude but with random frequency.

10. A modem for providing secure communication to a computer system, said modem comprising:

an interface circuit for sending digital data from said computer system;

a random number generator for generating a random number, said random number generator comprising:

a first signal source for generating a first random signal;

a second signal source for generating a second random signal; and a subtractor for generating a difference signal of said first random signal and said second random signal, wherein generating said difference causes any interference signal components common to both said first random signal and said second random signal to be eliminated and wherein said difference signal can be used to generate said random number;

a control circuit for receiving said random number and using said random number for encrypting said digital data; and a data pump for sending said encrypted digital data to an external system.

11. The modem of claim 10, wherein said data pump is designed to receive data from said external system, wherein said random number generator is designed to generate another random number, and said control circuit uses said another random number to decrypt said another random number.

12. The modem of claim 11, wherein said interference components are introduced by a source external to said modem.

13. The modem of claim 11, wherein said first signal source and said second signal source are designed to be located in a similar positions relative to said external source such that both of the signal sources are similarly susceptible to said external source.

14. The modem of claim 11, wherein each of said first signal source and said second signal source comprises a resistor.

15. The modem of claim 11, wherein each of said two signal sources further comprise an amplifier for generating an amplified signal as said random signal, wherein both of said amplifiers are driven by a common power source such that any interference signal introduced by said common power source is eliminated in said subtractor.

16. A random number generator for generating random numbers, said random number generator comprising:

means for generating a first random signal;

means for generating a second random signal;

means for subtracting one of said two random signal from the other to generate a difference signal; and means for sampling said difference signal to generate said random number, wherein the subtraction enables any common interference signals in said first random signal and said random signal to be eliminated.

17. A method of generating a random number, said method comprising the steps of:

(a) generating a first random signal;

(b) generating a second random signal;

(c) subtracting one of said two random signal from the other to generate a difference signal; and (d) sampling said difference signal to generate said random number, wherein the subtraction of step (c) enables any common interference signals in said first random signal and said random signal to be eliminated.

* * * * *